United States Patent
Ehlers et al.

(10) Patent No.: US 9,580,176 B2
(45) Date of Patent: Feb. 28, 2017

(54) AIRCRAFT REGION

(71) Applicant: Airbus Operations GmbH, Hamburg (DE)

(72) Inventors: Bernd Ehlers, Hamburg (DE); Martin Metten, Hamburg (DE); Stefan Behrens, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/278,118

(22) Filed: May 15, 2014

(65) Prior Publication Data

US 2014/0339364 A1 Nov. 20, 2014

(30) Foreign Application Priority Data

May 15, 2013 (DE) .......................... 10 2013 008 289

(51) Int. Cl.
*B64D 11/06* (2006.01)
*B64D 11/00* (2006.01)

(52) U.S. Cl.
CPC .............. *B64D 11/06* (2013.01); *B64D 11/00* (2013.01); *B64D 11/0629* (2014.12); *B64D 11/0691* (2014.12); *B64D 2011/0092* (2013.01)

(58) Field of Classification Search
None
See application file for complete search history.

(56) References Cited

U.S. PATENT DOCUMENTS

| | | | | |
|---|---|---|---|---|
| 3,594,037 A * | 7/1971 | Sherman | ........................ | 297/14 |
| 4,639,012 A * | 1/1987 | Jensen | ...................... | A61G 5/08 |
| | | | | 280/47.4 |
| 4,679,749 A * | 7/1987 | Ryan et al. | ............... | 244/122 R |
| 4,799,632 A * | 1/1989 | Baymak et al. | ........... | 244/122 R |
| 4,902,069 A * | 2/1990 | Lehnert | ............................ | 297/14 |
| 4,913,487 A * | 4/1990 | Breckel et al. | ................... | 297/14 |
| 5,112,069 A * | 5/1992 | Aldus | ...................... | A47C 4/42 |
| | | | | 280/42 |
| 5,180,120 A * | 1/1993 | Simpson et al. | ............ | 244/118.6 |
| 5,358,263 A * | 10/1994 | Aldus | ...................... | A61G 5/08 |
| | | | | 280/42 |
| 5,707,103 A * | 1/1998 | Balk | ................................ | 297/13 |
| 6,227,489 B1 * | 5/2001 | Kitamoto et al. | .......... | 244/118.5 |
| 6,460,922 B1 * | 10/2002 | Demick | ........................... | 297/14 |
| 7,108,226 B2 * | 9/2006 | Quan et al. | ................ | 244/118.6 |

(Continued)

FOREIGN PATENT DOCUMENTS

| | | |
|---|---|---|
| DE | 3634839 | 4/1988 |
| DE | 102005043610 | 3/2007 |

(Continued)

OTHER PUBLICATIONS

German Search Report, May 15, 2013.

*Primary Examiner* — Medhat Badawi
(74) *Attorney, Agent, or Firm* — Greer, Burns & Crain, Ltd.

(57) ABSTRACT

An aircraft region comprising a main aisle extending along a longitudinal axis of an aircraft cabin, a door aisle extending along a transverse axis of the aircraft cabin substantially perpendicularly to the main aisle and an aircraft monument arranged in the door aisle and comprising at least one flight attendant seat facing a section of the main aisle adjoining the door aisle.

17 Claims, 9 Drawing Sheets

(56) References Cited

U.S. PATENT DOCUMENTS

| | | | |
|---|---|---|---|
| 7,201,349 B2* | 4/2007 | Lavie et al. | 244/118.5 |
| 8,220,742 B2 | 7/2012 | Bolder et al. | |
| 8,820,862 B1* | 9/2014 | Erickson | B64D 11/0691 312/257.1 |
| 2005/0023413 A1* | 2/2005 | Saint-Jalmes | 244/118.6 |
| 2007/0018046 A1* | 1/2007 | Boren | 244/118.6 |
| 2007/0102579 A1* | 5/2007 | Krieglsteiner et al. | 244/129.1 |
| 2007/0241232 A1* | 10/2007 | Thompson | 244/118.6 |
| 2007/0295863 A1* | 12/2007 | Thompson | 244/118.6 |
| 2008/0302911 A1* | 12/2008 | Warner | B64D 11/00 244/118.6 |
| 2009/0146004 A1* | 6/2009 | Plant | 244/118.5 |
| 2009/0206200 A1 | 8/2009 | Bolder et al. | |
| 2009/0261200 A1* | 10/2009 | Saint-Jalmes et al. | 244/118.5 |
| 2010/0181425 A1* | 7/2010 | Guering et al. | 244/118.5 |
| 2011/0114788 A1* | 5/2011 | Mosler et al. | 244/118.5 |
| 2011/0273849 A1* | 11/2011 | Jaeger | 361/725 |
| 2012/0041619 A1* | 2/2012 | Rudduck et al. | 701/3 |
| 2013/0126671 A1* | 5/2013 | Guering | 244/118.6 |
| 2013/0206904 A1* | 8/2013 | Gee et al. | 244/118.5 |
| 2013/0334369 A1* | 12/2013 | Schliwa et al. | 244/118.5 |
| 2014/0008492 A1 | 1/2014 | Ehlers et al. | |
| 2014/0048650 A1* | 2/2014 | Schliwa et al. | 244/118.5 |
| 2014/0125092 A1* | 5/2014 | Schreuder | B64D 11/00 297/163 |
| 2014/0209741 A1* | 7/2014 | Boenning et al. | 244/118.6 |
| 2014/0224931 A1* | 8/2014 | Weitzel et al. | 244/118.6 |
| 2014/0319275 A1* | 10/2014 | Najd et al. | 244/118.6 |
| 2014/0339360 A1* | 11/2014 | Moje et al. | 244/118.5 |
| 2014/0339362 A1* | 11/2014 | Moje et al. | 244/118.5 |
| 2014/0375086 A1* | 12/2014 | Schliwa et al. | 297/14 |
| 2015/0166182 A1* | 6/2015 | Ducreux | B64D 11/06 244/118.6 |

FOREIGN PATENT DOCUMENTS

| | | |
|---|---|---|
| DE | 102008009938 | 9/2009 |
| DE | 102010013330 | 10/2011 |
| DE | 102011013049 | 9/2012 |
| WO | 2012045931 | 4/2012 |
| WO | 2012119718 | 9/2012 |
| WO | 2013123065 | 8/2013 |

* cited by examiner

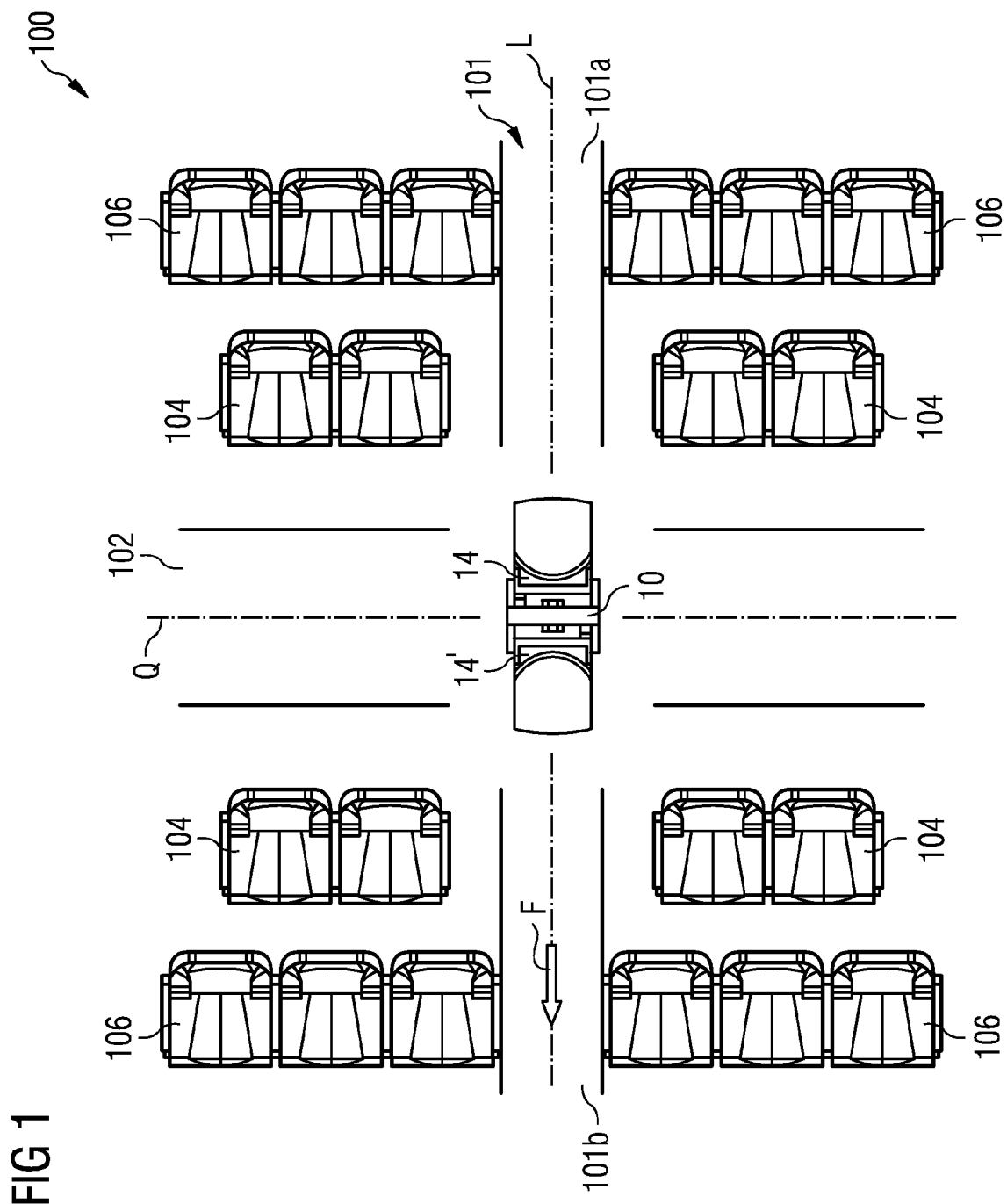

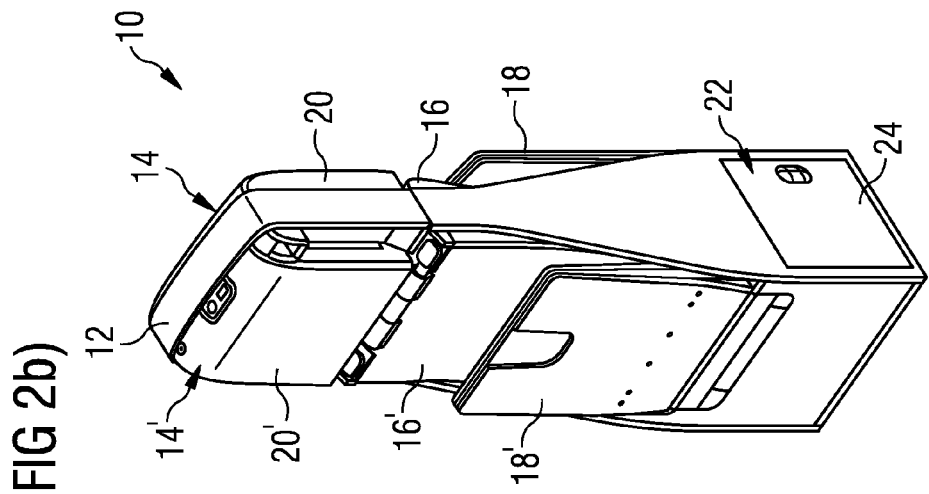
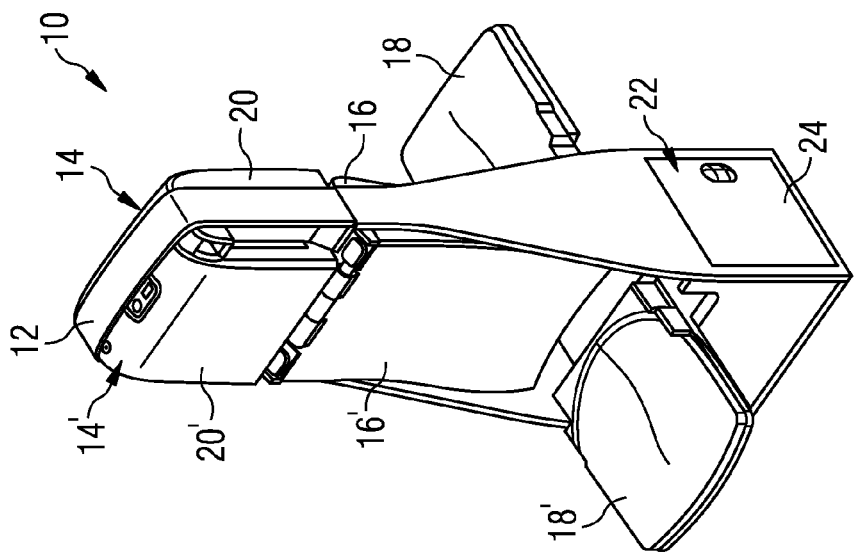

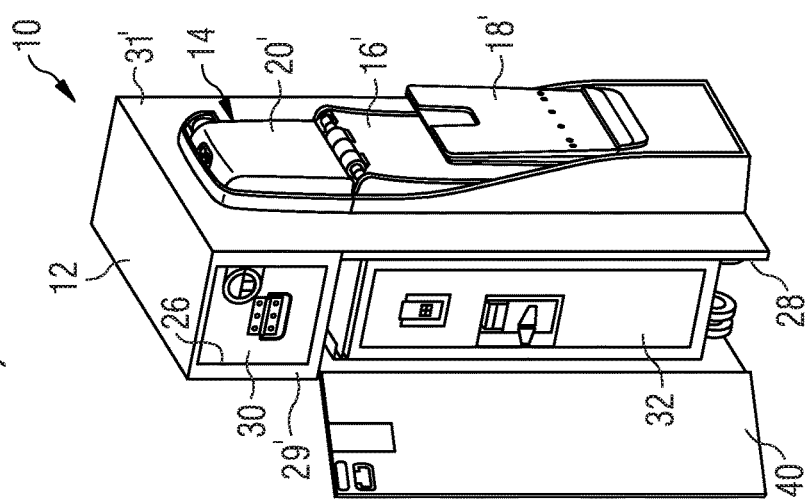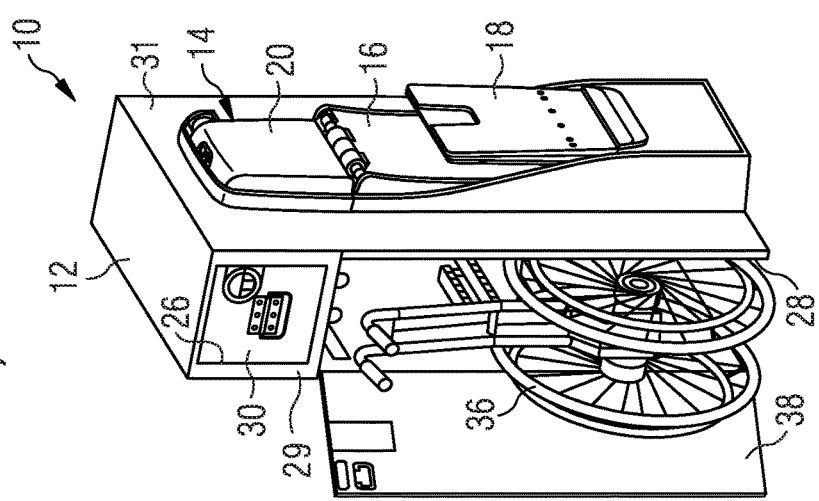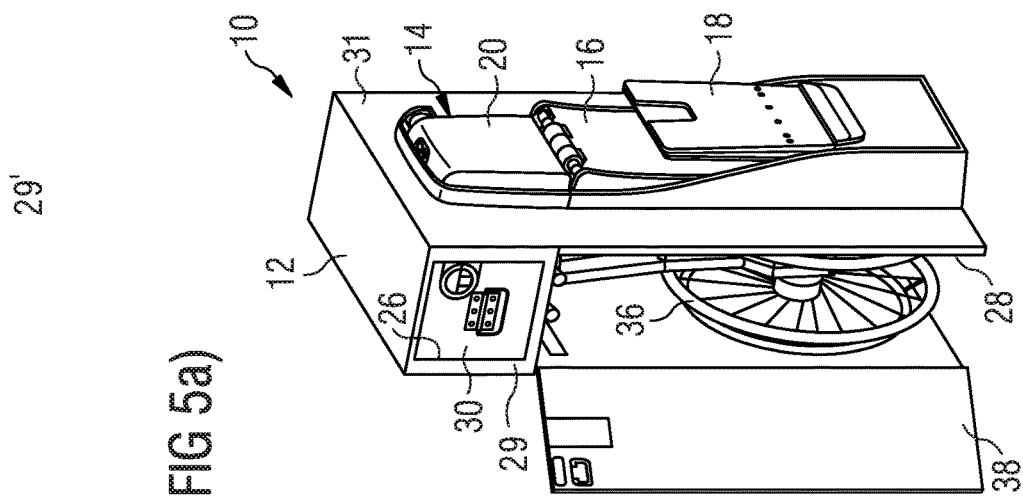

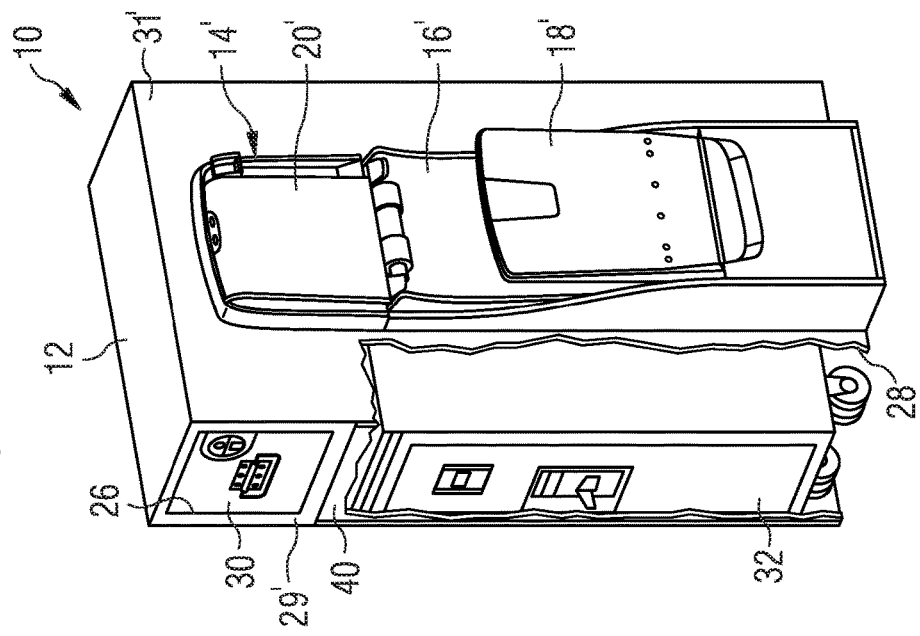
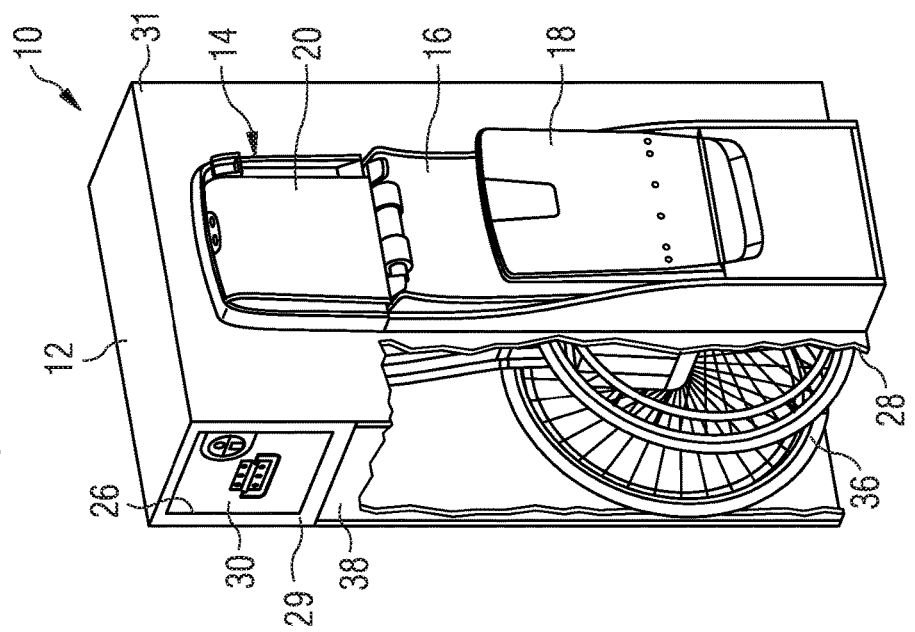

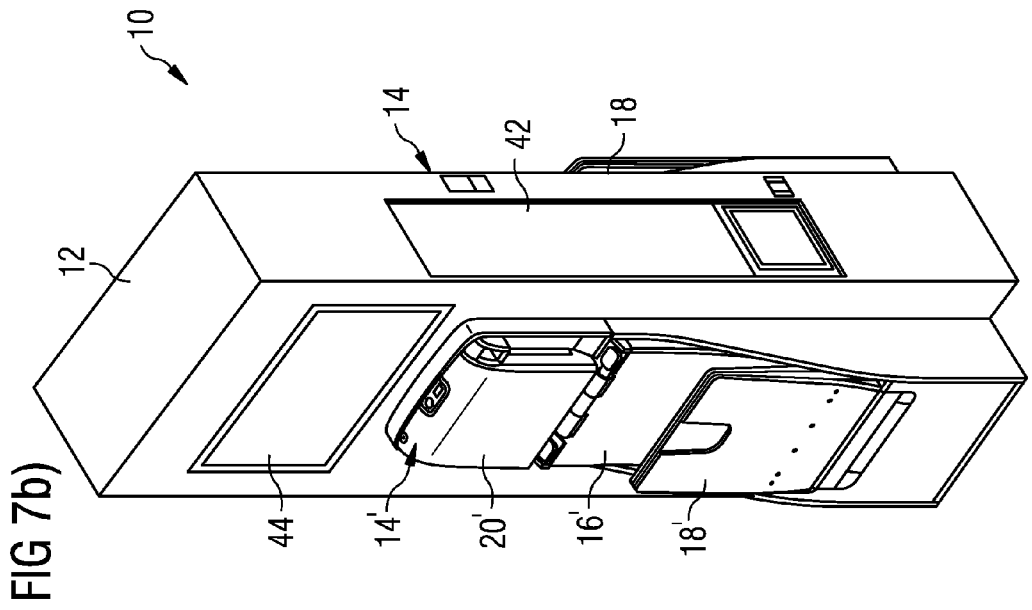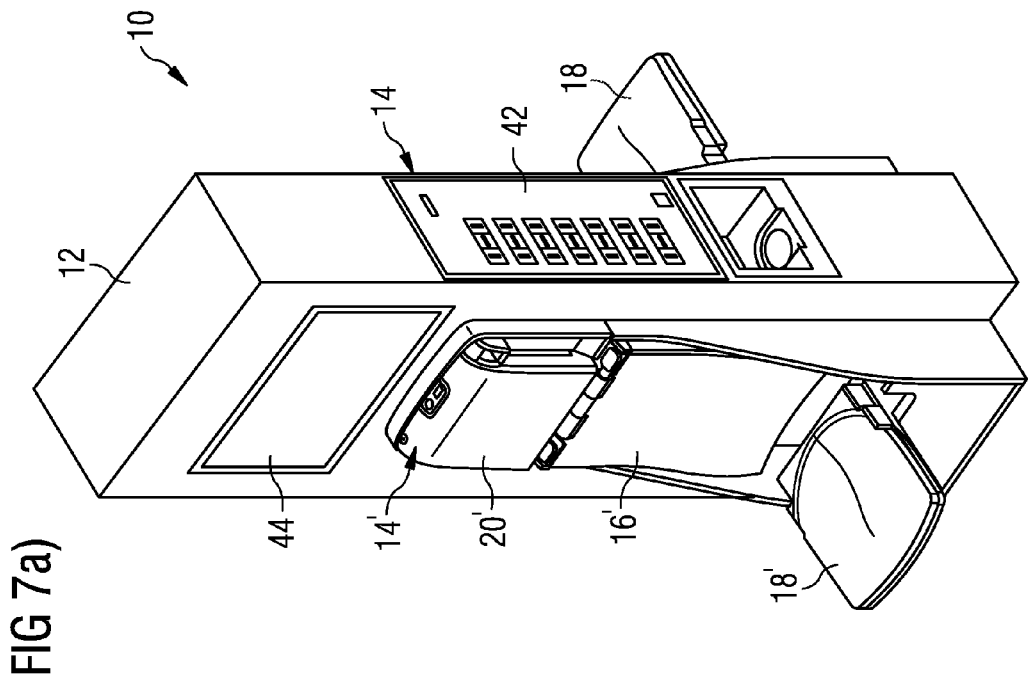

AIRCRAFT REGION

CROSS-REFERENCES TO RELATED APPLICATIONS

This application claims the benefit of the German patent application No. 10 2013 008 289.7 filed on May 15, 2013, the entire disclosures of which are incorporated herein by way of reference.

BACKGROUND OF THE INVENTION

The invention relates to an aircraft region formed in particular by a region of an aircraft cabin.

A passenger cabin of a modern commercial aircraft normally comprises at least one main aisle extending along a longitudinal axis of the passenger cabin. Running perpendicularly to the main aisle is at least one door aisle which connects the main aisle to an aircraft door. A lateral boundary of the door aisle can be formed by a side wall of a monument adjoining the door aisle. Such an aircraft region arrangement is described, for example, in DE 10 2011 013 049 A1 or WO 2012/119718 A1.

Furthermore, the passenger cabin of a commercial aircraft is normally equipped with flight attendant seats on which flight attendants can sit during take-off and landing as well as during turbulences and breaks of the aircraft. The flight attendant seats are normally arranged in the door regions of the aircraft cabin. From DE 10 2008 009 938 A1 or US 2009/206200 A1 there is known, for example, a flight attendant seat, the backrest of which adjoins a side wall of a monument, for example a toilet module, and which has a folding seat element pivotable relative to the backrest.

SUMMARY OF THE INVENTION

An object on which the invention is based is to specify an aircraft region, the design of which enables efficient use of the space available in an aircraft passenger cabin.

An aircraft region comprises a main aisle extending along or in the direction of a longitudinal axis of an aircraft cabin. The main aisle may, for example, separate two passenger seat regions of the aircraft cabin from one another, wherein each passenger seat region may have a plurality of passenger seat rows arranged one behind the other and having, for example, three passenger seats each. Furthermore, the aircraft region comprises a door aisle extending along a transverse axis of the aircraft cabin substantially perpendicularly to the main aisle between a first and second aircraft door. The door aisle may, for example, separate a Business Class region of the aircraft cabin from an Economy Class region of the aircraft cabin, but also lie completely in a region of the aircraft cabin assigned to a particular class.

An aircraft monument is arranged in the door aisle. By arranging the aircraft monument in the door aisle, a region of the aircraft cabin hitherto kept free is used for monument installation. Consequently, the installation space used for installation of aircraft monuments in conventional aircraft cabin layouts can be used otherwise, for example for additional passenger seats.

Finally, the aircraft monument comprises at least one flight attendant seat facing a section of the main aisle adjoining the door aisle. Through this configuration of the aircraft monument, high safety standards can be met since a person sitting on the flight attendant seat has a good and unobstructed direct view of the aircraft cabin region arranged in front of the aircraft monument in the line of sight of the person sitting on the flight attendant seat. The flight attendant seat may comprise a backrest element and a seat element. The seat element may be pivotable between a folded-down use position, in which the seat element extends substantially perpendicularly to the backrest element, and a rest position, in which the seat element is oriented substantially parallel to the backrest element. This ensures that the flight attendant seat takes up a reduced installation space volume when it is not being used.

Preferably, the flight attendant seat is arranged substantially centrally with respect to the section of the main aisle facing the flight attendant seat. Such a positioning of the flight attendant seat enables a person sitting on the flight attendant seat to have a particularly good view of the aircraft cabin region arranged in front of the aircraft monument in the line of sight of the person sitting on the flight attendant seat, without the person sitting on the flight attendant seat having to move from a comfortable sitting position.

The aircraft monument is preferably arranged substantially centrally in the door aisle. This ensures that persons can walk past the monument unobstructed. Moreover, the central arrangement of the aircraft monument in the door aisle enables the aircraft monument to be used as part of a guiding system for emergency evacuations. In particular, the aircraft monument can perform a guiding function for persons moving along the main aisle in the direction of the aircraft doors, since the persons are necessarily guided by the aircraft monument necessarily in the direction of the aircraft doors. In the event of an emergency evacuation of the aircraft, this may have a positive effect on the evacuation time.

In a preferred embodiment of the aircraft region, the aircraft monument comprises two flight attendant seats. In particular, the aircraft monument may comprise a first flight attendant seat facing a first section of the main aisle adjoining the door aisle, and a second flight attendant seat facing a second section of the main aisle adjoining the door aisle, the first and the second section of the main aisle being separated from one another by the door aisle. Accordingly, the aircraft monument may be positioned in the aircraft region in such a manner that the first flight attendant seat faces a rear region of the aircraft cabin, with respect to the direction of flight of an aircraft equipped with the aircraft region, while the second flight attendant seat faces a front region of the aircraft cabin, with respect to the direction of flight of an aircraft equipped with the aircraft region. This arrangement of the aircraft monument ensures that a person sitting on the first flight attendant seat can keep a watch unobstructed and directly on the rear aircraft cabin region. Similarly, a person sitting on the second flight attendant seat can keep a watch unobstructed and directly on the front aircraft cabin region.

Furthermore, the aircraft monument may comprise at least one safety belt arrangement. Preferably, the number of safety belt arrangements provided on the aircraft monument corresponds to the number of flight attendant seats provided on the aircraft monument, so that each flight attendant seat can be fitted with a corresponding safety belt arrangement.

The aircraft monument may further comprise at least one storage compartment. For example, the storage compartment may be adapted, that is to say shaped and dimensioned, so that a galley standard unit, a trolley and/or an in particular foldable wheelchair in the folded-up state can be accommodated in the storage compartment. The aircraft monument may comprise a storage compartment which is shaped and dimensioned so that a trolley or a foldable wheelchair in the folded-up state can be accommodated in the storage compartment. Alternatively to this, the aircraft monument may also comprise two storage compartments, one of which can receive a trolley and one of which can receive a foldable wheelchair in the folded-up state. Furthermore, the at least one storage compartment may serve to accommodate pieces of equipment which have to be carried in the cabin of an aircraft, such as, for example, a fire extinguisher, a first aid kit, a blanket or an oxygen bottle.

The storage compartment may be closable by means of a door. A storage compartment suitable for receiving smaller objects or a galley standard unit is preferably arranged in the aircraft monument so that it is conveniently accessible to a person standing or kneeling in front of the aircraft monument. A storage compartment suitable for receiving a trolley or a foldable wheelchair preferably extends as far as the floor of an aircraft cabin equipped with the aircraft region, so that the trolley or wheelchair can be rolled into the storage compartment. A storage compartment which is suitable for accommodating a trolley and a foldable wheelchair is preferably accessible from two mutually opposite sides of the aircraft monument and may be closable in the region of two mutually opposite sides of the aircraft monument by means of a corresponding door.

Furthermore, the aircraft monument may comprise a vending machine. The vending machine may be, for example, a machine which contains drinks or snacks which are dispensed to the passengers, optionally for payment, during the cruising of an aircraft equipped with the aircraft region. An aircraft monument comprising a vending machine is particularly advantageous when the aircraft equipped with the aircraft region is used on flights, for example short-haul flights, where the passengers are offered only a limited catering service.

The aircraft monument may comprise a support column carrying the at least one flight attendant seat. The support column may be fastened via suitable fastening devices to the floor of an aircraft cabin equipped with the aircraft region. For example, it is conceivable to anchor the support column in a seat rail which is integrated into the floor of the aircraft cabin equipped with the aircraft region. The flight attendant seat may be fastened in a force-transmitting manner to the support column. A fastening device fixing the flight attendant seat in a force-transmitting manner to the support column is preferably designed and dimensioned so that it is capable of carrying away via the support column a specified maximum force which can be introduced into the flight attendant seat on use of the flight attendant seat. The support column is preferably likewise designed and dimensioned so that it is capable of transmitting to the aircraft structure, for example via the aircraft cabin floor, the maximum force introduced into the support column.

The maximum force which the fastening device or the support column has to carry away is specified by appropriate approval regulations. In particular, the maximum force is a calculated maximum force which acts on the flight attendant seat in an emergency. For example, a force which acts on the flight attendant seat when the flight attendant seat is subjected to an acceleration of 9 G or 16 G can be taken as the specified maximum force. The at least one storage compartment and/or the vending machine can be integrated into the support column of the aircraft monument carrying the at least one flight attendant seat.

The at least one storage compartment and/or the vending machine is/are preferably integrated into the support column of the aircraft monument carrying the at least one flight attendant seat in such a manner that the storage compartment and/or the vending machine is/are accessible via a surface region of the support column facing the door aisle. The access to the storage compartment and/or the vending machine is then not impeded by the flight attendant seat which is attached to the support column in a surface region of the support column facing the main aisle.

The aircraft monument may n further comprise at least one display screen. The display screen may be adapted to display advertising, safety instructions or the like to the passengers of an aircraft equipped with the aircraft region. The at least one display screen is therefore preferably integrated into the aircraft monument in a position such that it is clearly visible to passengers sitting on their seats in the passenger cabin of the aircraft.

For example, the at least one display screen may be integrated into the support column of the aircraft monument carrying the at least one flight attendant seat. In particular when the aircraft monument comprises, besides the display screen, a further power-consuming device, such as e.g., a vending machine, the combining of different functionalities in the aircraft monument enables a centralization of supply systems required for supplying the aircraft monument, wherein the different functional regions of the aircraft monument may be connected via a common connection to a central power supply system of the aircraft.

The at least one display screen is preferably integrated into the support column of the aircraft monument carrying the at least one flight attendant seat in such a manner that the display screen faces a section of the main aisle adjoining the door aisle. In particular, the display screen may face a rear region of the aircraft cabin, with respect to the direction of flight of an aircraft equipped with the aircraft region, in which rear region the passengers sit looking towards the display screen. For example, the display screen may be positioned above the flight attendant seat in a surface region of the support column facing the main aisle. The display screen is then particularly clearly visible to passengers sitting on their seats in the passenger cabin of the aircraft.

BRIEF DESCRIPTION OF THE DRAWINGS

Preferred embodiments of the invention will now be explained in more detail with the aid of the appended, schematic drawings, of which FIG. 1 shows a plan view of an aircraft region in which an aircraft monument comprising two flight attendant seats is arranged, FIGS. 2a and 2b show three-dimensional detail illustrations of the aircraft monument arranged in the aircraft region according to FIG. 1, FIGS. 7a and 7b show three-dimensional detail illustrations of the still further alternative aircraft monument arranged in the aircraft region according to FIG. 6.

DETAILED DESCRIPTION OF THE PREFERRED EMBODIMENTS

Figure 3:
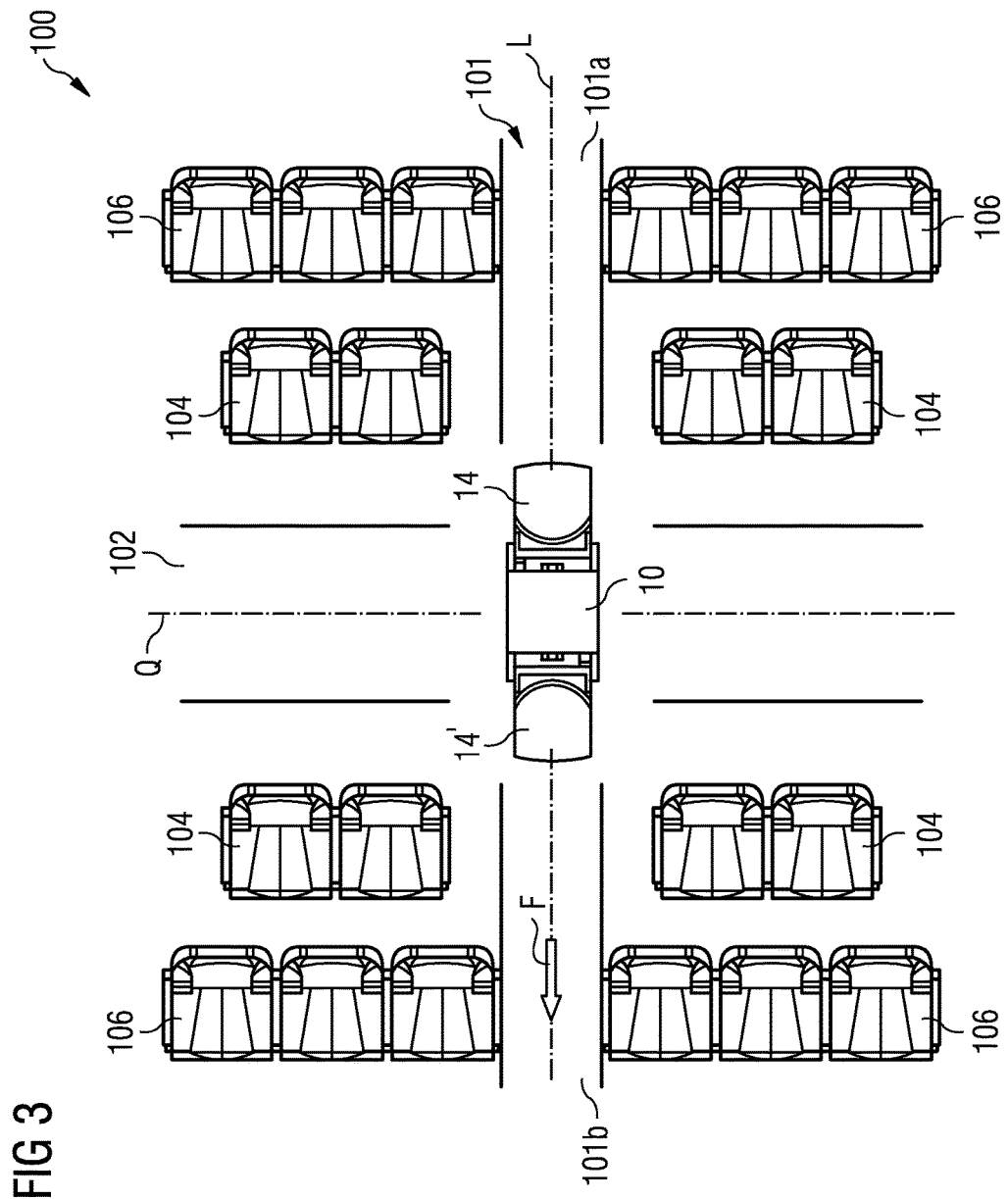
FIG. 3 shows a plan view of an aircraft region in which an alternative aircraft monument comprising two flight attendant seats is arranged.
Figure 6:
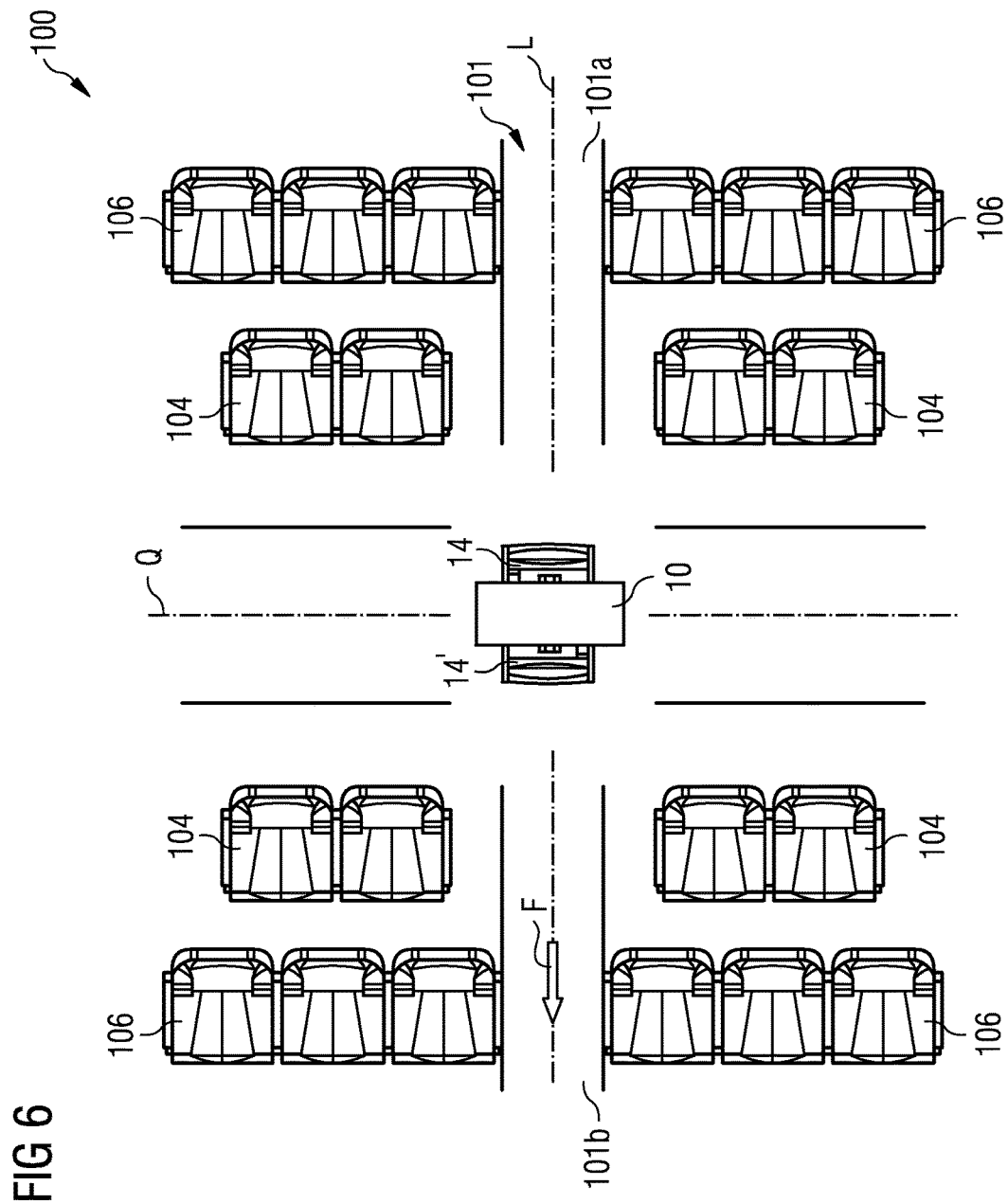
FIG. 6 shows a plan view of an aircraft region in which a still further alternative aircraft monument comprising two flight attendant seats is arranged.

FIGS. 1, 3 and 6 each show an aircraft region 100 which is formed by a part of an aircraft cabin. The aircraft region 100 comprises a main aisle 101 extending along a longitudinal axis L of the aircraft cabin and a door aisle 102 which extends substantially perpendicularly to the main aisle 101 along a transverse axis Q of the aircraft cabin between aircraft doors, not illustrated in FIGS. 1, 3 and 6. Consequently, viewed in the direction of flight F, the door aisle 102 separates a front part of the aircraft cabin from a rear part of the aircraft cabin.

An aircraft monument 10, illustrated in more detail in FIGS. 2a and 2b, is arranged substantially centrally in the door aisle 102. Through the central arrangement in the door aisle 102 the aircraft monument 10 acts, in the event of an emergency evacuation of the aircraft, as part of a guiding system. In particular, the aircraft monument 10 performs a guiding function for persons moving along the main aisle 101 in the direction of the aircraft doors, since these persons are necessarily guided by the aircraft monument 10 in the direction of the aircraft doors. This may have a positive effect on the evacuation time.

As becomes clear from FIG. 1, the number and/or the arrangement of interior fitting components adjacent to the aircraft monument 10 in the aircraft region 100 can be adapted to the shape and the dimensions of the aircraft monument 10. In particular, passenger seat rows 104 adjacent to the aircraft monument 10 can comprise one passenger seat fewer than passenger seat rows 106 further away from the aircraft monument 10. The dimensions of the aircraft monument 10 are dimensioned so that passengers sitting in the rear part of the aircraft cabin can look past the aircraft monument 10 into the front part of the aircraft cabin. This may have a positive effect on the evacuation time.

The aircraft monument 10 arranged in the aircraft region 100 comprises a support column 12 and two flight attendant seats 14, 14' which are fastened in a force-transmitting manner to the support column 12 by means of a fastening device, not illustrated specifically. The support column 12 is, for its part, fastened via suitable fastening devices to a floor of the aircraft cabin equipped with the aircraft region 100. For example, the support column 12 can be anchored in a seat rail which is integrated into the floor of the aircraft cabin equipped with the aircraft region 100. The fastening device fixing the flight attendant seats 14, 14' in a force-transmitting manner to the support column 12 is designed and dimensioned so that it is capable of carrying away via the support column 12 a specified maximum force which can be introduced into the flight attendant seats 14, 14' on use of the flight attendant seats 14, 14'. The support column 12 is likewise designed and dimensioned so that it is capable of transmitting to the aircraft structure via the aircraft cabin floor the maximum force introduced into the support column. In particular, the fastening device for fastening the flight attendant seats 14, 14' to the support column 12 and the support column 12 are capable of carrying away a force which acts on the flight attendant seats 14, 14' when the flight attendant seats 14, 14' are subjected to an acceleration of 9 G or 16 G.

The flight attendant seats 14, 14' each face a section 101a, 101b of the main aisle 101 adjoining the door aisle 102 and are substantially centrally arranged with respect to the main aisle 101, so that persons sitting on the flight attendant seats 14, 14' have a good and unobstructed view of aircraft cabin regions arranged in front of the aircraft monument 10, in the line of sight of the persons sitting on the flight attendant seats 14, 14'. In particular, a first flight attendant seat 14 faces a first section 101a of the main aisle 101, while a second flight attendant seat 14' faces a second section 101b of the main aisle 101, the first and the second section 101a, 101b of the main aisle 101 being separated from one another by the door aisle 102.

Accordingly, the aircraft monument 10 is positioned in the aircraft region 100 in such a manner that the first flight attendant seat 14 faces a rear region of the aircraft cabin, with respect to the direction of flight of an aircraft equipped with the aircraft region 100, while the second flight attendant seat 14' faces a front region of the aircraft cabin, with respect to the direction of flight of an aircraft equipped with the aircraft region 100. This arrangement of the aircraft monument 10 ensures that a person sitting on the first flight attendant seat 14 can keep a watch unobstructed and directly on the rear aircraft cabin region. Similarly, a person sitting on the second flight attendant seat 14' can keep a watch unobstructed and directly on the front aircraft cabin region.

Each flight attendant seat 14, 14' comprises a backrest element 16, 16', a seat element 18, 18' and a headrest 20, 20'. As can best be seen from a comparison of FIGS. 2a and 2b, the seat element 18, 18' is pivotable between a folded-down use position, in which the seat element 18, 18' extends substantially perpendicularly to the backrest element 16, 16' (see FIGS. 1 and 2a) and a rest position, in which the seat element 18, 18' is oriented substantially parallel to the backrest element 16, 16' (see FIG. 2b). This ensures that the flight attendant seats 14, 14' take up a reduced installation space volume when they are not being used. When the seat elements 18, 18' of the flight attendant seats 14, 14' are situated in their rest position, an unobstructed passage between the aircraft monument 10 and the passenger seat rows 104 adjacent to the aircraft monument is possible in the aircraft region 100.

The aircraft monument 10 further comprises a storage compartment 22 which is suitable for receiving small objects. The storage compartment 22 is integrated into the support column 12 of the aircraft monument 10 carrying the flight attendant seats 14, 14' and is closable by means of a door 24. In particular, the door 24 is arranged in a surface region of the support column 12 facing the door aisle 102, so that the storage compartment 22 is accessible via the surface region of the support column 12 facing the door aisle 102. The storage compartment 22 may, however, also be accessible from two opposing sides of the support column 12. As a result, the access to the storage compartment 22 is not impeded by the flight attendant seats 14, 14'. The storage compartment 22 is thus conveniently accessible to a person standing or kneeling in front of the aircraft monument 10 in the door aisle 102.

Figure 4A:
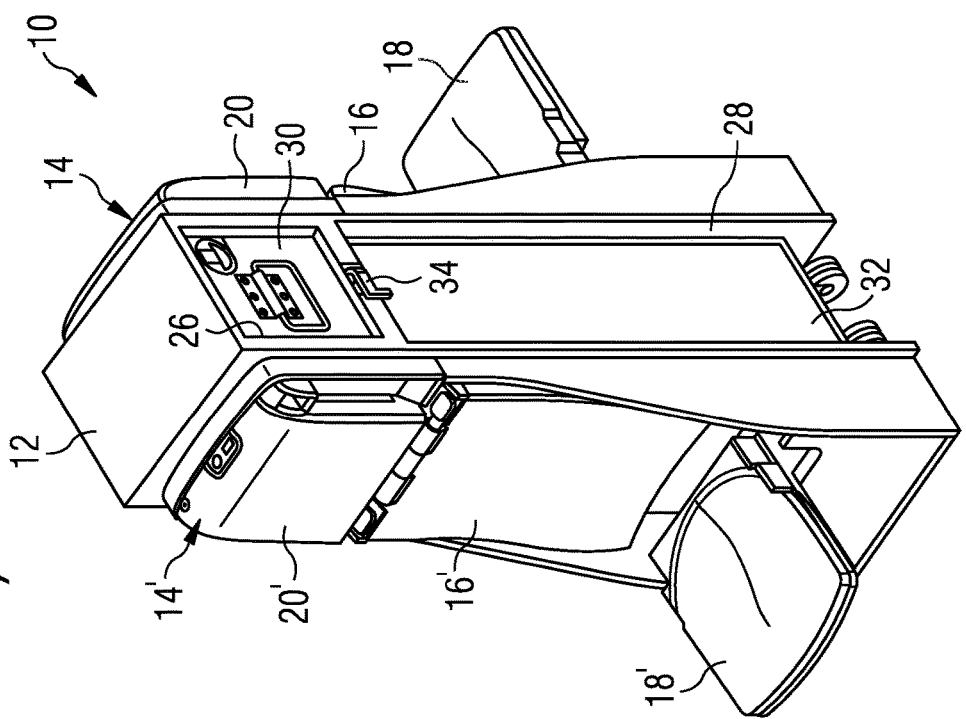
FIGS. 4a and 4b show three-dimensional detail illustrations of the alternative aircraft monument arranged in the aircraft region according to FIG. 3, FIGS. 5a to 5h show three-dimensional detail illustrations of a further alternative aircraft monument suitable for arranging in the aircraft region according to FIG. 1 or 3.
Figure 4B:
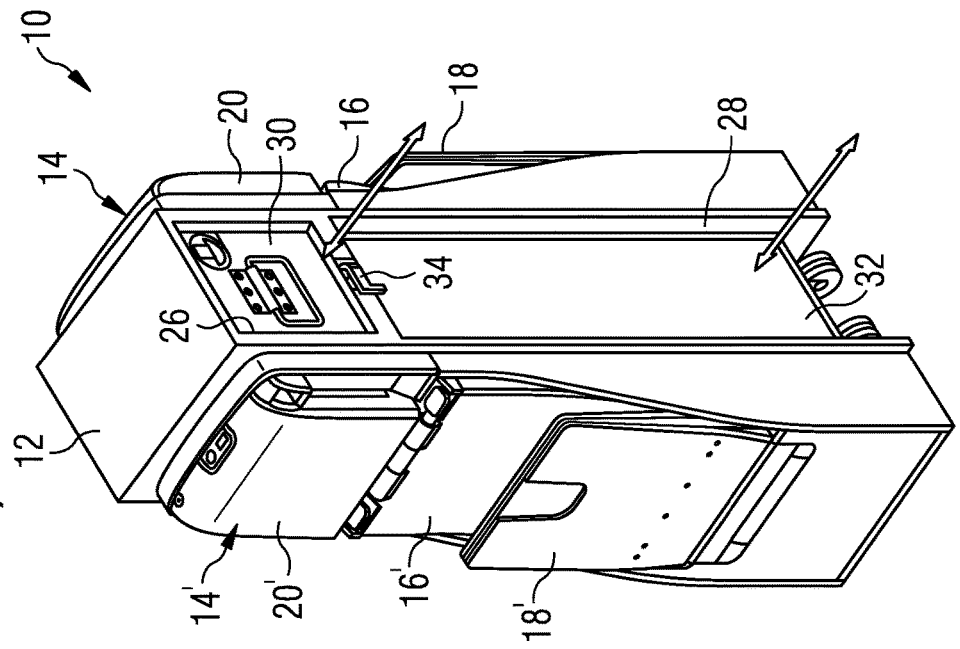
Figure 5F:
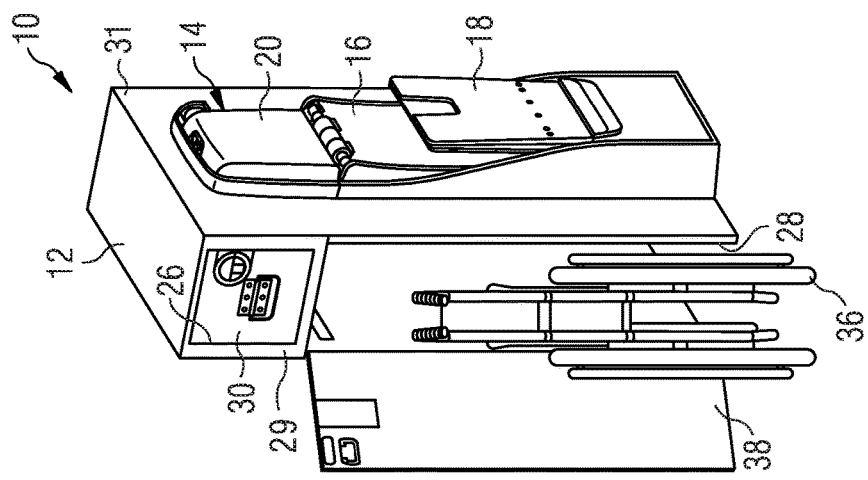
Figure 5E:
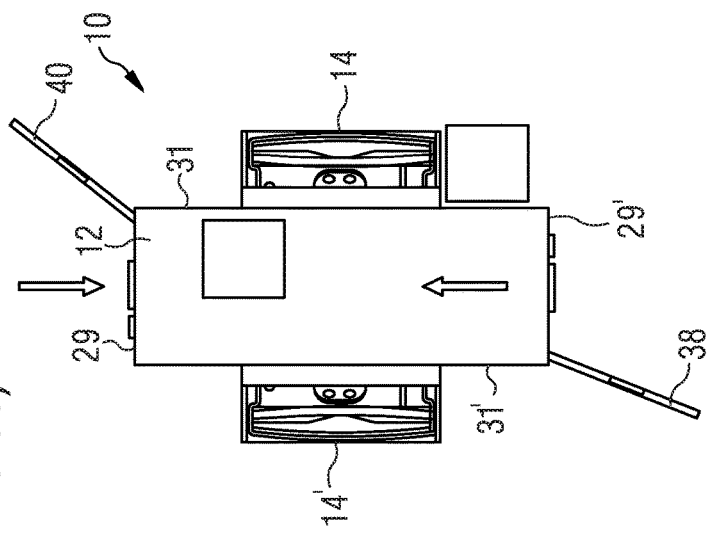
Figure 5D:
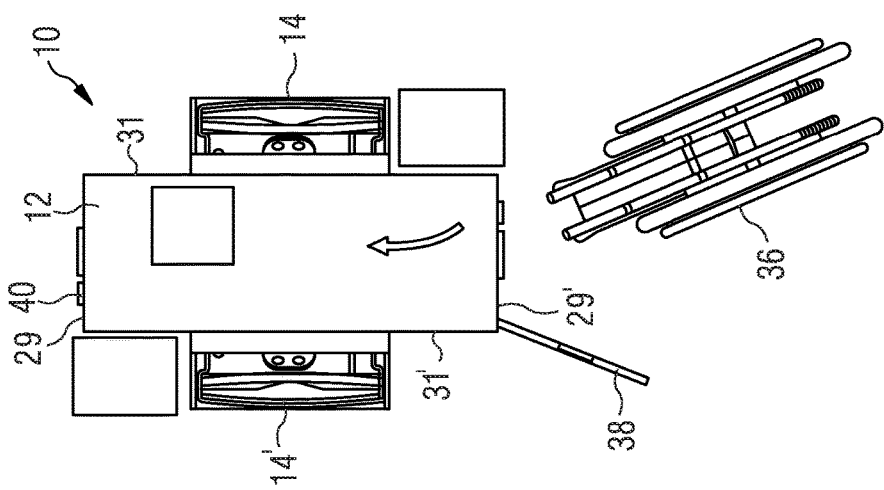

An aircraft region 100 shown in FIG. 3 differs from the arrangement according to FIG. 1 in that an alternative aircraft monument 10 arranged in the aircraft region 100 and illustrated in more detail in FIGS. 4a and 4b has an enlarged support column 12 which provides space for two storage compartments 26, 28. A first storage compartment 26 is shaped and dimensioned so that a galley standard unit 30 can be accommodated in the first storage compartment 26. A second storage compartment 28, by contrast, serves to receive a trolley 32. The storage compartments 26, 28 are accessible from both sides of the support column 12 or from only one side of the support column 12. The second storage compartment 28 is positioned beneath the first storage compartment 26, in the direction of the floor of the aircraft cabin equipped with the aircraft region 100, and is open in the direction of the floor of the aircraft cabin equipped with the aircraft region 100, so that the trolley 32 can be conveniently pushed into the storage compartment 28 and pulled out of the storage compartment 28. A locking device 34 serves to secure a trolley 32, arranged in the storage compartment 28, in its position in the storage compartment 28. Doors for closing the storage compartments 26, 28 have been dispensed with in this embodiment of the aircraft monument 10. As a result, a lightweight design of the aircraft monument 10 is possible.

Otherwise, the structure and the function of the aircraft region 100 according to FIG. 3 correspond to the structure and the function of the arrangement according to FIG. 1.

In FIGS. 5a to 5h there is shown a further alternative aircraft monument 10 which is suitable for arranging in an aircraft region 100 illustrated, for example, in FIGS. 1 and 3. In a manner similar to the aircraft monument 10 illustrated in FIGS. 4a and 4b, the aircraft monument 10 according to FIGS. 5a to 5h also comprises two storage compartments 26, 28. The first storage compartment 26 is, again, shaped and dimensioned so that a galley standard unit 30 can be accommodated in the first storage compartment 26. A second storage compartment 28, by contrast, is dimensioned so that the second storage compartment 28 can receive, besides a trolley 32, also a foldable wheelchair 36 in the folded-up state. The second storage compartment 28 is accessible from two mutually opposite side walls 29, 29' separated by side walls 31, 31' of the aircraft monument 10 and closable, correspondingly, in the region of these two mutually opposite side walls 29, 29' of the aircraft monument 10 by means of corresponding doors 38, 40.

Otherwise, the structure and the function of the aircraft monument 10 according to FIGS. 5a to 5h correspond to the structure and the function of the arrangement according to FIGS. 4a and 4b.

An aircraft region 100 shown in FIG. 6 differs from the arrangement according to FIG. 3 in that a still further alternative aircraft monument 10, arranged in the aircraft region 100 and illustrated in more detail in FIGS. 7a and 7b, comprises a vending machine 42 integrated into the support column 12, instead of a storage compartment integrated into the support column 12. The vending machine 42 can be, for example, a machine which contains drinks or snacks which are dispensed to the passengers, optionally for payment, during the cruising of an aircraft equipped with the aircraft region 100.

Furthermore, the aircraft monument 10 comprises a display screen 44 which is integrated into the support column 12 of the aircraft monument 10 above the first flight attendant seat 14 and faces the rear region of an aircraft cabin equipped with the aircraft region 100. The display screen 44 can be used to display advertising, safety instructions or the like to passengers sitting in the rear region of an aircraft cabin equipped with the aircraft region 100.

Otherwise, the structure and the function of the aircraft region 100 according to FIG. 6 correspond to the structure and the function of the arrangement according to FIG. 3.

Features described here in connection with specific embodiments of an aircraft region and of an aircraft monument can be combined with one another in any combinations.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft region comprising:
a main aisle extending along a longitudinal axis of an aircraft cabin,
a door aisle extending along a transverse axis of the aircraft cabin substantially perpendicularly to the main aisle and
an aircraft monument arranged in the door aisle and comprising a first pair of opposing side walls and a second pair of opposing side walls and at least one flight attendant seat mounted on an outer face of one of the first pair of side walls having a width wider than a width of the at least one flight attendant seat and the at least one flight attendant seat facing a section of the main aisle adjoining the door aisle, wherein the door aisle separates two passenger seat sections of the aircraft cabin,
wherein the aircraft monument comprises at least one storage compartment formed by the first and second pairs of side walls and shaped and dimensioned to receive at least one of a galley standard unit and a trolley,
wherein the storage compartment is accessible from two mutually opposite sides of the aircraft monument and closable, correspondingly, in the region of these two mutually opposite sides of the aircraft monument by means of corresponding doors.

2. An aircraft region comprising:
a main aisle extending along a longitudinal axis of an aircraft cabin,
a door aisle extending along a transverse axis of the aircraft cabin substantially perpendicularly to the main aisle, and
an aircraft monument arranged in the door aisle in a crossing region of the door aisle with the main aisle and comprising a first pair of opposing side walls and a second pair of opposing side walls and at least one flight attendant seat mounted on an outer face of one of the first pair of side walls having a width wider than a width of the at least one flight attendant seat and the at least one flight attendant seat facing a section of the main aisle adjoining the door aisle, wherein the door aisle separates two passenger seat sections of the aircraft cabin wherein the aircraft monument comprises at least one storage compartment formed by the first and second pairs of side walls and shaped and dimensioned to receive at least one of a galley standard unit and a trolley, wherein the storage compartment is accessible from two mutually opposite sides of the aircraft monument and closable, correspondingly, in the region of these two mutually opposite sides of the aircraft monument by means of corresponding doors.

3. The aircraft region according to claim 2, wherein the aircraft monument is arranged substantially centrally in the door aisle.

4. The aircraft region according to claim 2, wherein the aircraft monument comprises a first flight attendant seat facing a first section of the main aisle adjoining the door aisle, and a second flight attendant seat facing a second section of the main aisle adjoining the door aisle, the first and the second section of the main aisle being separated from one another by the door aisle.

5. The aircraft monument according to claim 1, wherein the aircraft monument is also adapted to receive a folded wheelchair, the wheelchair when folded having a shape and dimension receivable within the shape and dimension of the storage compartment.

6. The aircraft region according to claim 1, wherein the storage compartment accommodates pieces of equipment.

7. The aircraft region according to claim 6, wherein the pieces of equipment accommodated in the storage compartment are at least one fire extinguisher, at least one first aid kit, at least one blanket and at least one oxygen bottle.

8. The aircraft region according to claim 2, wherein the aircraft monument comprises a vending machine.

9. The aircraft region according to claim 1, wherein the at least one storage compartment is integrated into a support column of the aircraft monument carrying the at least one flight attendant seat.

10. The aircraft region according to claim 8, wherein the vending machine is integrated into a support column of the aircraft monument carrying the at least one flight attendant seat.

11. The aircraft region according to claim 9, wherein the at least one compartment is integrated into the support column of the aircraft monument carrying the at least one flight attendant seat in such a manner that the storage compartment is accessible via a surface region of the support column facing the door aisle.

12. The aircraft region according to claim 10, wherein the vending machine is integrated into the support column of the aircraft monument carrying the at least one flight attendant seat in such a manner that the vending machine is accessible via a surface region of the support column facing the door aisle.

13. The aircraft region according to claim 2, wherein the aircraft monument comprises at least one display screen.

14. The aircraft region according to claim 13, wherein the at least one display screen is integrated into a support column of the aircraft monument carrying the at least one flight attendant seat.

15. The aircraft region according to claim 14, wherein the at least one display screen is integrated into the support column of the aircraft monument carrying the at least one flight attendant seat in such a manner that the display screen faces a section of the main aisle adjoining the door aisle.

16. The aircraft region according to claim 2, wherein the at least one flight attendant seat is arranged substantially centrally with respect to the section of the main aisle.

17. An aircraft region comprising:
a main aisle extending along a longitudinal axis of an aircraft cabin,
a door aisle extending along a transverse axis of the aircraft cabin substantially perpendicularly to the main aisle, and separating a first section of the main aisle and a first section of passenger seats from a second section of the main aisle and a second section of passenger seats,
an aircraft monument arranged in the door aisle in a crossing region of the door aisle with the main aisle and comprising a first pair of opposing side walls and a second pair of opposing side walls and at least one first flight attendant seat mounted on an outer face of one of the first pair of side walls having a width wider than a width of the at least one flight attendant seat and the at least one flight attendant seat facing the first section of passenger seats and at least one second flight attendant seat facing the second section of passenger seats,
the aircraft monument comprising at least one storage compartment formed by the first and second pairs of side walls and positioned between the at least one first flight attendant seat and the at least one second flight attendant seat, with an opening of said at least one storage compartment extending to a floor of the aircraft cabin and said at least one storage compartment shaped and dimensioned to receive at least one of a galley standard unit and a trolley,
wherein the storage compartment is accessible from two mutually opposite sides of the aircraft monument and closable, correspondingly, in the region of these two mutually opposite sides of the aircraft monument by means of corresponding doors.

\* \* \* \* \*